(12) United States Patent
Hyde et al.

(10) Patent No.: US 6,439,505 B1
(45) Date of Patent: Aug. 27, 2002

(54) RADOME DEICER

(75) Inventors: Robert William Hyde, Green; Thomas Steve Betchel, Norton; Guy Neil Shemwell, Akron; James Hobart Crist, Canton, all of OH (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/730,201

(22) Filed: Dec. 5, 2000

(51) Int. Cl.[7] .............................................. B64D 15/00
(52) U.S. Cl. .................................................. 244/134 A
(58) Field of Search ........................ 244/134 B, 134 A, 244/121

(56) References Cited

U.S. PATENT DOCUMENTS

| | | | |
|---|---|---|---|
| 542,878 A | 7/1895 | Evinof | |
| 2,343,918 A | * 3/1944 | McCoy | 244/134 B |
| 2,560,287 A | * 7/1951 | Harper | 244/134 R |
| 2,599,059 A | 6/1952 | Jones | 244/134 |
| 2,957,662 A | 10/1960 | Hess | 244/134 |
| 3,690,601 A | * 9/1972 | Roemke | 244/134 A |
| 4,463,919 A | * 8/1984 | Bac | 244/134 A |
| 4,747,575 A | 5/1988 | Putt et al. | 251/30.02 |
| 4,749,997 A | * 6/1988 | Canonico | 343/708 |
| 4,999,639 A | 3/1991 | Frazita | 343/704 |
| 5,112,011 A | * 5/1992 | Weisend, Jr. et al. | 244/134 A |
| 5,528,249 A | 6/1996 | Gafford et al. | 343/704 |
| 5,558,304 A | * 9/1996 | Adams | 244/134 A |
| 5,562,265 A | * 10/1996 | Rauckhorst, III | 244/134 A |
| 5,677,252 A | 10/1997 | Gilde et al. | 501/97 |
| 5,841,066 A | 11/1998 | Bocherens | 174/2 |

FOREIGN PATENT DOCUMENTS

| | | |
|---|---|---|
| JP | 57065005 | 4/1982 |
| JP | 57065024 | 4/1982 |
| JP | 57065033 | 4/1982 |
| JP | 57099806 | 6/1982 |
| JP | 2052505 | 2/1990 |
| JP | 4329002 | 11/1992 |
| JP | 5160621 | 6/1993 |
| JP | 9326618 | 12/1997 |

* cited by examiner

*Primary Examiner*—Galen L. Barefoot
(74) *Attorney, Agent, or Firm*—Renner, Otto, Boisselle & Sklar, L.L.P.

(57) ABSTRACT

A deicer (10) for a radome (12) includes an active portion (16) through which transmission occurs and a non-active portion (18) which is attached to an aircraft (14). The deicer (10) comprises a cap portion (20) covering the active portion (16) of the radome (12) but unattached thereto. The cap portion (20) comprises layers (36, 38) defining inflatable/ deflatable chambers (24), the layers both being made of non-extensible material such as square woven nylon fabric. When the chambers (24) are inflated, the inner layer (38) lifts off of the active portion (16) of the radome (12). The deicer (10) can additionally comprise a skirt portion (22) which is stretchable to accommodate the inflation of the chambers (24).

37 Claims, 3 Drawing Sheets

RADOME DEICER

FIELD OF THE INVENTION

The present invention relates generally as indicated to a radome deicer and, more particularly, to a radome deicer having inflatable/deflatable chambers for use on an aircraft antenna radome.

BACKGROUND OF THE INVENTION

A radome is provided as a protective housing for antennas or other equipment which transmit and/or receive electromagnetic waves in hostile environments. In some applications, such as with a radome installed on an airplane or helicopter, the radome is highly susceptible to icing. Ice build-up on the outside surface of a radome can contribute to attenuation and distortion of the transmitted/received electromagnetic waves and thus must be removed if the equipment is to operate appropriately.

In the past, deicers have been used to remove ice accumulation on aircraft structures such as, for example, airfoils, impeller blades, and/or intake nozzles. Such aircraft deicers are generally designed to effectively remove accumulated ice without overly impacting any important flight forces (e.g. lift, drag, weight). A radome deicer must not only meet this criteria, but must also be designed to avoid adversely altering the incoming/outgoing electromagnetic waves so that transmission effectiveness is not reduced. Moreover, a radome deicer often presents other special design considerations not usually encountered with other aircraft deicers.

SUMMARY OF THE INVENTION

The present invention provides a radome deicer which removes ice accumulation without sacrificing transmission effectiveness.

More particularly, the present invention provides a radome deicer comprising a cap portion covering the active portion of a radome but unattached thereto. The cap portion can comprise an inner layer and an outer layer defining inflatable/deflatable chambers. When the chambers are deflated, the inner layer lies flat against the active portion of the radome. When the chambers are inflated, the inner layer is lifted off the active portion of the radome. The inner and outer chamber-defining layers can each be made of an non-stretchable material (e.g., square woven nylon fabric) so that the inflated chambers have a tube shape with a roughly circular cross-section. A stretchable skirt portion can be attached to the cap portion to allow the deicing cap to lift off of the active portion of the radome when the chambers are inflated.

This construction of the radome deicer allows it to be thinner than conventional pneumatic deicers. Specifically, the thickness of the cap portion is less than 0.070 inch, less than 0.060 inch, and/or about 0.050 inch. This is at least 0.020 inch thinner than a conventional deicer wherein the inner chamber-defining layer is bonded to the aircraft structure and the outer chamber-defining layer is made of an extensible material. A deicer according to the present invention having a thickness of about 0.050 inch is especially suitable for use on a radome wherein the housed radio equipment receives/transmits at higher frequencies.

The deicer of the present invention can be constructed so that an active radome portion having a complex compound-curved shape can still be covered with a square woven fabric. Specifically, the carcass of the radome deicer has a cap portion made from two non-extensible layers (which define the chambers) and a skirt portion made from an extensible layer. The non-stretchable chamber-defining layers can be formed from a plurality of panels. For example, if a dome-shaped distal portion of the radome is its active portion, roughly triangular panels can be joined together to form the cap portion of the carcass.

The carcass can be provided with a fluid-path construction that allows the use of an external air connection located remote from the radome base as is sometimes necessary if the radome is internally pressurized. Specifically, a channel is formed in the carcass by an extension tab of the non-extensible layers which is secured to the extensible layer by seams. The channel communicates with the chambers and can extend through the skirt portion whereby fluid can be introduced and evacuated to inflate and deflate the chambers.

The carcass can be constructed to prolong the fatigue life of the deicer by preventing over-stretching and cracking of a cover layer of the deicer. Specifically, the seams on the outer surface of the carcass can each comprise a stitch line, a gum coating over the stitch line, and a fabric strip over the gum coating. These seams may include chamber-defining seams, cap-skirt attachment seams, channel-forming seams, and/or chamber-closing seams.

Thus a radome deicer according to the present invention can be constructed thinner than conventional pneumatic deicers, can accommodate geometric shapes with square woven fabric, can be compatible with remote air connections, and/or can maintain an acceptable fatigue life. These and other features of the invention are fully described and particularly pointed out in the claims. The following description and annexed drawings set forth in detail a certain illustrative embodiment of the invention, this embodiment being indicative of but one of the various ways in which the principles of the invention can be employed.

DRAWINGS

DETAILED DESCRIPTION

Figure 1:
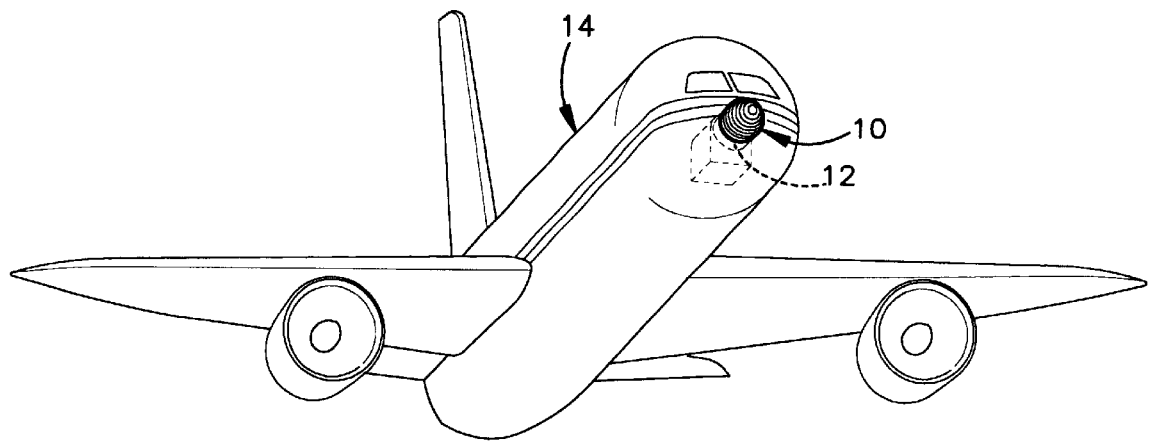
FIG. 1 is a schematic illustration of a deicer according to the present invention installed on a radome of an aircraft.

Referring now to the drawings in detail, and initially to FIG. 1, a deicer 10 according to the present invention is shown installed on a radome 12 of an aircraft 14. The radome 12 provides physical protection for aircraft antennas (not shown) which transmit and/or receive electromagnetic waves.

Figures 2, 3:
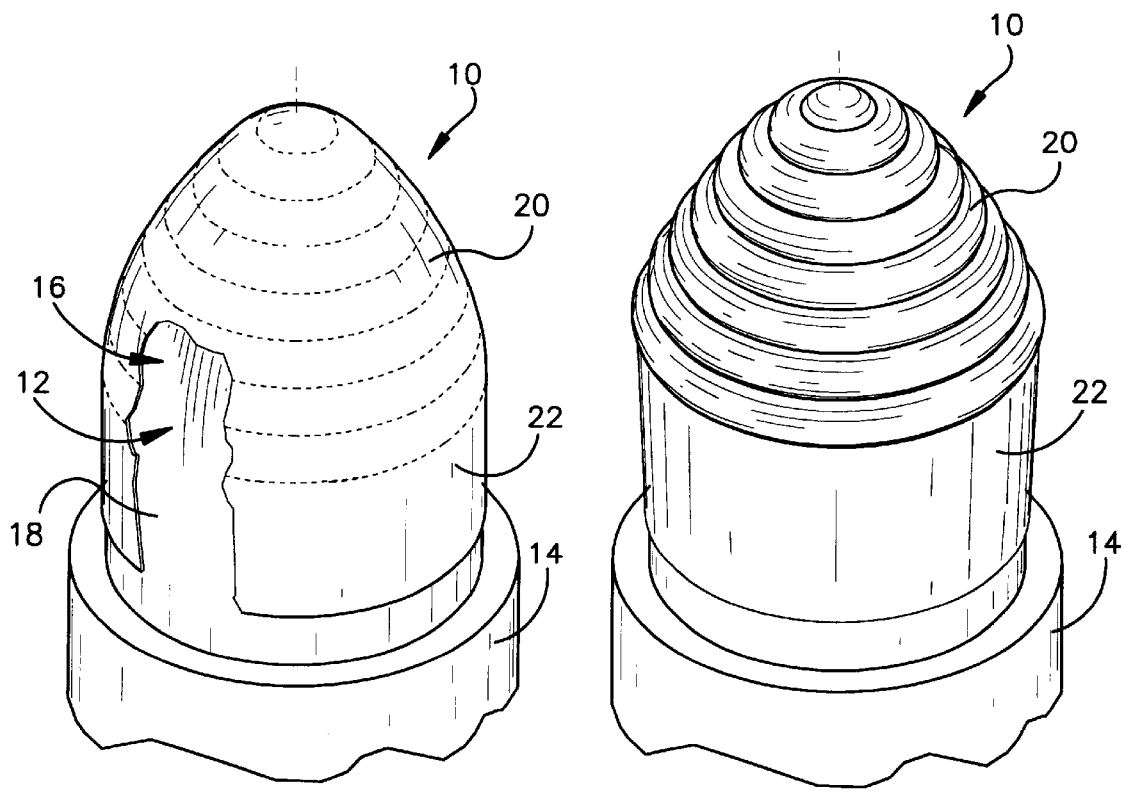
FIG. 2 is a perspective view of the radome deicer in a deflated condition.
FIG. 3 is a perspective view of the radome deicer in an inflated condition.

Referring now to FIGS. 2 and 3, in the illustrated embodiment, the radome 12 includes an active distal portion 16 through which transmission occurs and a non-active proximate portion 18 for attachment to the aircraft 14. In the illustrated embodiment, the radome's distal portion 16 has a dome shape that roughly resembles a half-egg shape (the more pointed half). The proximate portion 18 has a roughly cylindrical shape extending tangentially therefrom.

The radome deicer 10 is shown in a deflated condition in FIG. 2 and in an inflated condition in FIG. 3. The deicer 10 includes a cap portion 20 which covers the radome's distal portion 16 and a skirt portion 22 which covers the radome's proximate portion 18. The skirt portion 22 is attached to the radome 12 along its lower circular circumference by, for example, cementing it thereto. The other portions of the deicer 10, and particularly the cap portion 20, are unattached to the radome 12.

Figures 4, 5:
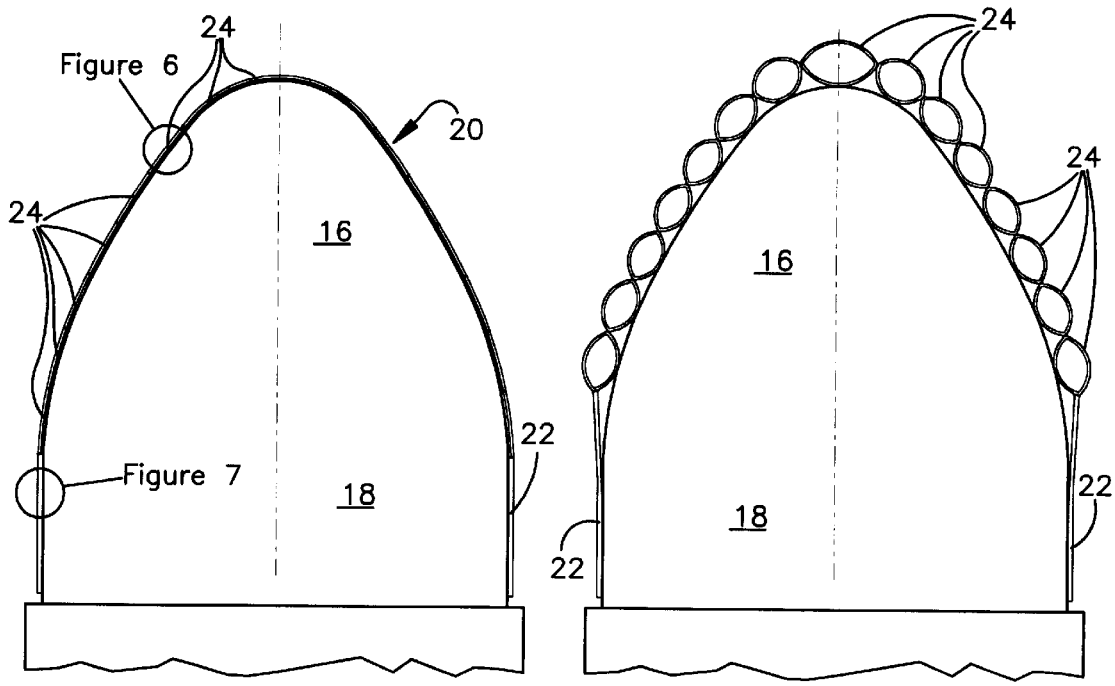
FIG. 4 is a cross-section of the radome deicer in the deflated condition.
FIG. 5 is a cross-section of the radome deicer in the inflated condition.

Referring additionally to FIGS. 4 and 5, it can be seen that the deicer's cap portion 20 includes chambers 24 which transform the deicer 10 between its deflated condition (FIGS. 2 and 4) and its inflated condition (FIGS. 3 and 5). In the illustrated embodiment, the chambers 24 are positioned in parallel planes perpendicular to the axis of the radome 12. The chambers 24 have about the same width and, with the illustrated dome-shaped cap portion 20, have descending diameters towards the cap's distal end.

The chambers 24 are each connected to a pressure/suction source (not shown) so that they can be selectively inflated/deflated during flight. When the chambers 24 are deflated, the deicer's cap portion 20 lies flush against the outer surface of the radome 12 in a flattened condition. (FIG. 4.) When the chambers 24 are inflated, the deicer's cap portion 20 is lifted off of the outer surface of the radome 12 by the curved inner contour of the inflated chambers. (FIG. 5.) As the chambers 24 are inflated, the deicer's skirt portion 22 stretches or expands to accommodate the lifting of the cap portion 20. (Compare FIGS. 4 and 5.)

Figure 6:
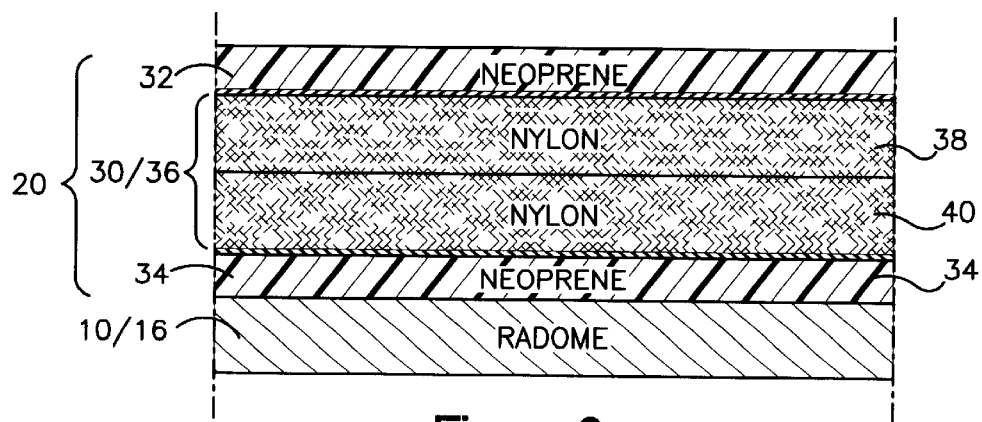
FIG. 6 is an enlarged cross-section of the deicer.
Figure 7:
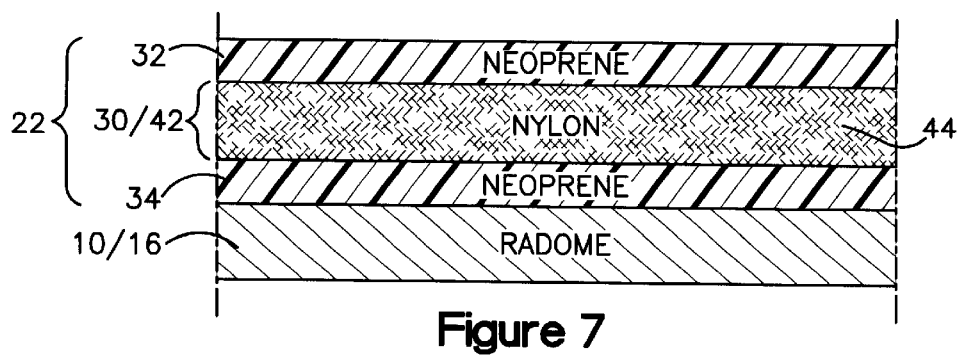
FIG. 7 is another enlarged cross-section of the deicer.

Referring now to FIGS. 6 and 7, it can be seen that the illustrated deicer 10 comprises a fabric carcass 30, an outer cover layer 32, and an inner base layer 34. The carcass 30 comprises a cap portion 36 formed by non-stretchable fabric layers 38 and 40 (FIG. 6) and a skirt portion 42 formed by a stretchable fabric layer 44 (FIG. 7). The outer cover layer 32 is bonded to the outer surfaces of the fabric layers 38 and 42 and the inner base layer 34 is bonded to the inner surfaces of the fabric layers 40 and 42.

The cap fabric layers 38 and 40 are each made of a square woven nylon fabric with rubber skim coating for sealing and are each approximately 0.012 inch thick. The outer cover layer 32 is made of a non-conductive neoprene and is approximately 0.010 inch thick. The inner base layer 34 is also made of non-conductive neoprene and is approximately 0.010 inch thick. Alternatively, the inner base layer 34 can be made of natural rubber gum and be approximately 0.012 inch thick. Thus, the cap portion 20 of the deicer 10 can have a thickness of less than 0.070 inch, less than 0.060 inch, and/or less than or about 0.050 inch thereby providing superior performance, especially with high frequency waves. The deicer 10 can be made so that its cap portion 20 is at least about 0.020 inch thinner than a conventional carcass having at least one of its cap fabric layers made of a stretchable fabric (i.e., knit nylon).

The skirt fabric layer 44 is made of a knit nylon fabric and is approximately 0.022 inch thick. However, it may be noted that thickness is not a crucial design criteria in the skirt portion 22/42 since it does not cover a transmitting portion of the radome 12. Instead, the important design parameters for the deicer skirt portion 22 and/or the carcass skirt portion 42 are sufficient stretch when the chambers 24 are inflated for ice-removal purposes and adequate attachment to the radome 12 for installation purposes. For this reason, the thickness of the layer 44, the layer 32, and/or the layer 34 can be increased in the skirt portion 22 of the deicer 10 if necessary or desired.

Figure 8:
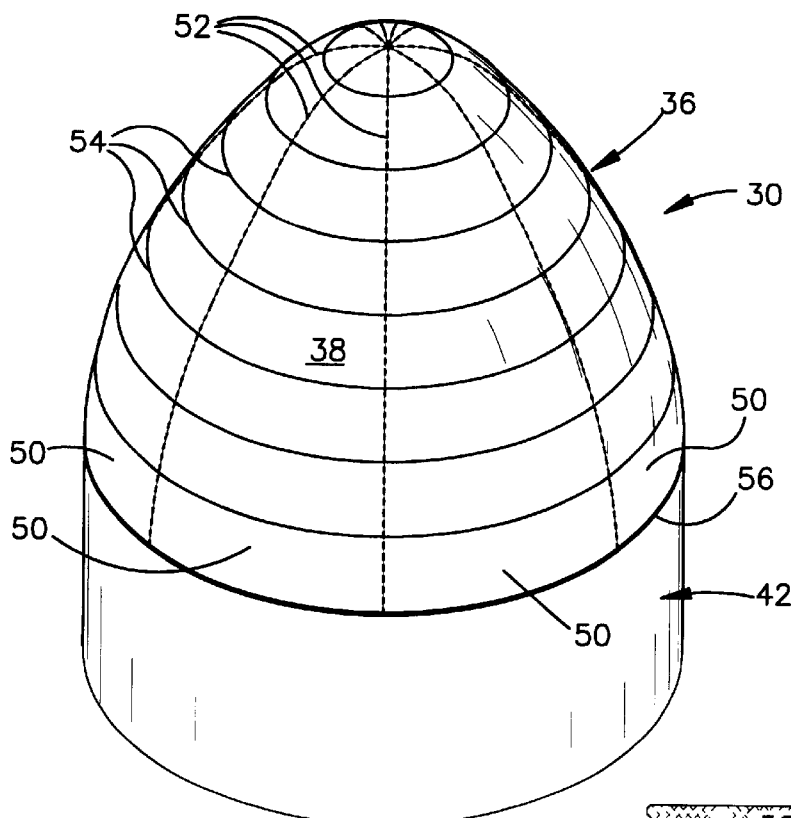
FIGS. 8 and 9, are front and rear views, respectively, of a carcass of the deicer.
Figure 9:
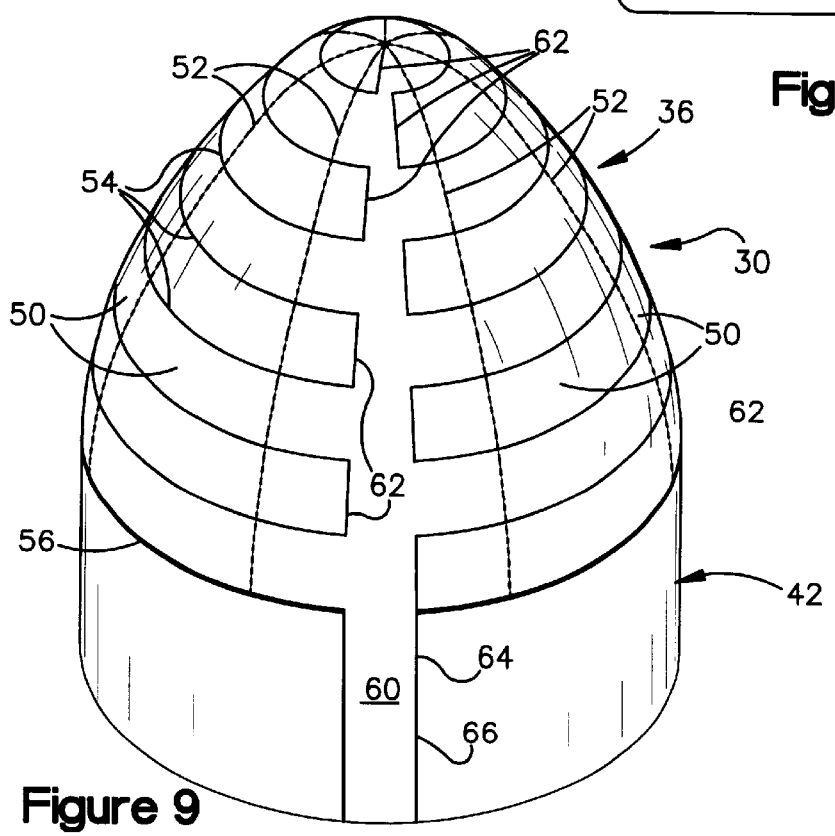

Referring now additionally to FIGS. 8 and 9, the carcass 30 is shown isolated from the other layers of the deicer 10. In the cap portion 36 of the carcass 30, the outer non-stretchable fabric layer 38 is formed from six triangular panels 50 sewn together by axially extending seams 52. Although not visible in the drawings, the inner fabric layer 40 is formed from similar panels joined with similar seams. This construction allows the deicer cap portion 20 and/or the carcass cap portion 36 to cover the complex compound-curved surface of the distal portion 16 of the radome 12.

The chambers 24 are defined by radial seams 54 and the bottom edge of the carcass cap portion 36 is joined to the carcass skirt portion 42 by a radial seam 56. As seen in FIG. 9, a channel 60 extends upwardly (in the illustrated orientation) through the carcass skirt portion 42 to the carcass cap portion 36 and interrupts the chamber-defining seams 54. The channel 60 forms a conduit from the pressure/suction source to the chambers 24. This fluid-path construction allows the use of an external air connection located remote from the radome base (i.e., two inches away) as is sometimes necessary if the radome is internally pressurized.

In the illustrated embodiment, one end of each chamber 24 is left open to the channel 60 and the other end is closed by a short axial seam 62. The open end and closed end can be alternated between adjacent chambers. For example, in the illustrated orientation, the lowermost chamber is unseamed on its left end and seamed on its right end while the next-up chamber is seamed on its right end and unseamed on its left end. Also in the illustrated embodiment, the channel 60 is formed by an extension tab 64 of the carcass cap portion 36 which is attached to the carcass skirt portion 42 by seams 66.

Figure 10:
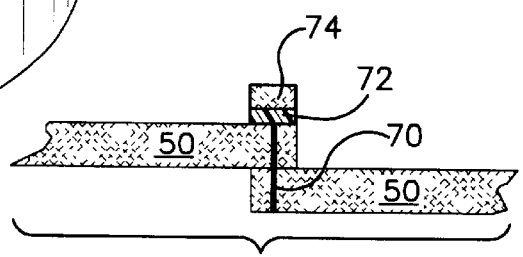
FIG. 10 is an enlarged cross-section of a seam of the carcass.

Referring now to FIG. 10, a panel-joining seam 52 is shown in detail which is used to join the panels 50 of the outer fabric layer 38 of the carcass cap portion 36. The illustrated seam 52 includes a stitch line 70, a gum coating 72, and a fabric strip 74. On the outer surface of the layer 38, the gum coating 72 is applied to the stitch line 70 and the fabric strip 74 is secured thereto. A suitable material for the stitch line 70 is nylon thread and a suitable material for the gum coating 72 is natural rubber. The fabric strips 74 can be made of the same material as the layers 38 and 40, that is square woven nylon fabric with a rubber skim sealing coat. All of the panel-joining seams 52, the chamber-defining seams 54, the cap-skirt attachment seam 56, the chamber-end seams 62, and the channel attachment seams 66 can be constructed in a similar manner so that all stitch lines on the outside surface of the carcass 30 have the gum coating 72 and the fabric strip 74 applied thereto. This seam construction is believed to prolong the fatigue life of the deicer 10 by protecting the outer cover layer 32 from over stretching and developing cracks above the seam lines.

One may now appreciate that the present invention provides a radome deicer 10 which effectively prevents ice accumulation without sacrificing antenna transmission characteristics. The deicer 10 can be constructed to be thinner than conventional pneumatic deicers, to cover complex curved geometric shapes with square woven fabric, to be compatible with remote air connections, and/or to have an acceptable fatigue life.

Although the invention has been shown and described with respect to a certain preferred embodiment, equivalent and obvious alterations and modifications will occur to others skilled in the art upon the reading and understanding of this specification. The present invention includes all such alterations and modifications and is limited only by the scope of the following claims.

What is claimed is:

1. A radome deicer comprising a cap portion adapted to cover an active portion of the radome and a skirt portion attached to the cap portion and adapted to be attached to a non-active portion of the radome;

the cap portion comprising an inner layer and an outer layer defining inflatable/deflatable chambers, the inner layer lifting off of the active portion of the radome when the chambers are inflated;

the skirt portion being stretchable to allow the deicing cap to lift off of the active portion of the radome when the chambers are inflated.

2. A radome deicer as set forth in claim 1, wherein the inner layer lies flat against the active portion of the radome when the chambers are deflated.

3. A radome deicer as set forth in claim 2, wherein the chambers, when inflated, have a tube-like shape with a roughly circular cross-section.

4. A radome deicer as set forth in claim 3, wherein the chambers are positioned in parallel planes perpendicular to an axis of the cap portion.

5. A radome deicer as set forth in claim 1, wherein both the inner chamber-defining layer and the outer chamber-defining layer are made of a non-stretchable material.

6. A radome deicer as set forth in claim 5, wherein the inner layer and the outer layer are each made of a non-stretchable fabric.

7. A radome deicer as set forth in claim 6, wherein the inner layer and the outer layer are each made of a square woven nylon fabric.

8. A radome deicer as set forth in claim 1, wherein the skirt portion comprises a stretchable layer attached to the inner chamber-defining layer and/or the outer chamber-defining layer.

9. A radome deicer as set forth in claim 1, wherein the cap portion further comprises a cover layer bonded to the outer surface of the outer chamber-defining layer and/or a base layer bonded to the inner surface of the inner chamber-defining layer.

10. A radome deicer as set forth in claim 9, wherein the cover layer and/or the base layer are made of a non-conductive neoprene.

11. A radome deicer as set forth in claim 1, wherein the thickness of the cap portion of the deicer is less than about 0.070 inch.

12. A radome deicer as set forth in claim 11, wherein the thickness of the cap portion of the deicer is less than about 0.060 inch.

13. A radome deicer as set forth in claim 12, wherein the thickness of the cap portion of the deicer is less than about 0.050 inch.

14. A radome deicer as set forth in claim 13, wherein the cap portion also comprises a cover layer bonded to the outer surface of the outer chamber-defining layer and a base layer bonded to the inner surface of the inner chamber-defining layer, wherein the cover layer is approximately 0.010 inch thick, the outer chamber-defining layer is approximately 0.012 inch thick, the inner chamber-defining layer is approximately 0.012 inch thick, and the cover layer is between approximately 0.010 to 0.012 inch thick.

15. A radome deicer as set forth in claim 14, wherein the cover layer is made of neoprene, wherein the base layer is made of neoprene or natural rubber gum, and wherein the chamber-defining layers are made of a square woven nylon fabric with a rubber coating.

16. A radome deicer as set forth in claim 15, wherein the cap portion has a dome-shape.

17. A carcass for the radome deicer set forth in claim 1, said carcass comprising non-stretchable fabric layers forming the inner and outer chamber-defining layers and a stretchable fabric layer forming the skirt portion.

18. A method of deicing a radome comprising the steps of installing the radome deicer of claim 1 onto the radome; and inflating/deflating the chambers to remove ice accumulation on the radome.

19. In combination, an aircraft and the radome deicer of claim 1, wherein the aircraft has transmitting/receiving equipment and a radome protecting this equipment, and wherein the deicer is installed on the radome.

20. In combination, a radome and the radome deicer of claim 1 installed on the radome.

21. A carcass for a radome deicer, comprising:

a cap portion comprising an inner non-stretchable layer and an outer non-stretchable layer defining inflatable/deflatable chambers; and a skirt portion comprising a stretchable layer attached to the inner chamber-defining layer and/or the outer chamber-defining layer;

wherein the non-stretchable chamber-defining layers are each formed from a plurality of panels joined together by seams.

22. A carcass as set forth in claim 21, wherein the cap portion has a dome-shape and wherein the panels are roughly triangular.

23. A carcass as set forth in claim 22, wherein boundaries of the chambers are defined by seams between the non-stretchable chamber-defining layers.

24. A carcass as set forth in claim 21, comprising a channel communicating with the chambers and wherein the channel extends through the skirt portion.

25. A carcass as set forth in claim 24, wherein the channel is formed by an extension tab of the non-extensible layers which is secured to the extensible layer with seams.

26. A carcass as set forth in claim 21, wherein the layers are joined together with a series of seams and wherein seams on the outer surface of the carcass each comprise a stitch line, a gum coating over the stitch line, and a fabric strip over the gum coating.

27. A carcass as set forth in claim 26, wherein the series of seams comprise seams between the non-stretchable layers which define the chambers and between the stretchable layer and at least one of the non-stretchable layers to attach the cap portion to the skirt portion.

28. A carcass as set forth in claim 27, wherein the series of seams additionally comprise a seam between an extension tab of the non-stretchable layers and the stretchable layer to form a channel communicating with the chambers.

29. A carcass as set forth in claim 28, wherein the series of seams further comprise seams extending between adjacent chamber-defining seams to close an end of the chamber from the channel.

30. A carcass as set forth in claim 21, wherein the non-stretchable chamber-defining layers comprise a square woven fabric and wherein the stretchable layer comprises a knit fabric.

31. A carcass as set forth in claim 21, wherein the non-stretchable chamber-defining layers comprise square woven nylon fabric with a rubber coating.

32. In combination, a radome for transmitting/receiving equipment and a deicer installed thereon;

the radome comprising an active portion through which transmitting and receiving occurs and a non-active portion;

the deicer comprising a cap portion covering the active portion of the radome but unattached thereto;

the cap portion lifting off of the active portion of the radome when the deicer is inflated.

33. A combination as set forth in claim 32, wherein the active portion is a distal portion of the radome and wherein the non-active portion is a proximate portion of the radome adapted to be attached to an aircraft.

34. A combination as set forth in claim 33, wherein the distal portion has a dome-shape and wherein the proximate portion has a cylindrical shape.

35. A combination as set forth in claim 34, wherein the deicer additionally comprises a skirt portion which is attached to the cap portion and attached to the non-active portion of the radome.

36. A combination as set forth in claim 35, wherein the cap portion comprises an inner layer and an outer layer defining inflatable/deflatable chambers and wherein the inner layer lifts off of the active portion of the radome when the chambers are inflated.

37. A combination as set forth in claim 36, wherein the skirt portion is stretchable to allow the deicing cap to lift off of the active portion of the radome when the chambers are inflated.

* * * * *